Dec. 16, 1952   W. P. OEHLER ET AL   2,621,983
FURROWING ATTACHMENT

Filed April 14, 1949   3 Sheets-Sheet 1

INVENTORS.
WILLIAM P. OEHLER
CHARLES H. YOUNGBERG
BY
ATTORNEYS

Dec. 16, 1952 W. P. OEHLER ET AL 2,621,983
FURROWING ATTACHMENT
Filed April 14, 1949 3 Sheets-Sheet 2

INVENTORS.
WILLIAM P. OEHLER
CHARLES H. YOUNGBERG
BY
ATTORNEYS

Dec. 16, 1952 W. P. OEHLER ET AL 2,621,983
FURROWING ATTACHMENT
Filed April 14, 1949 3 Sheets-Sheet 3
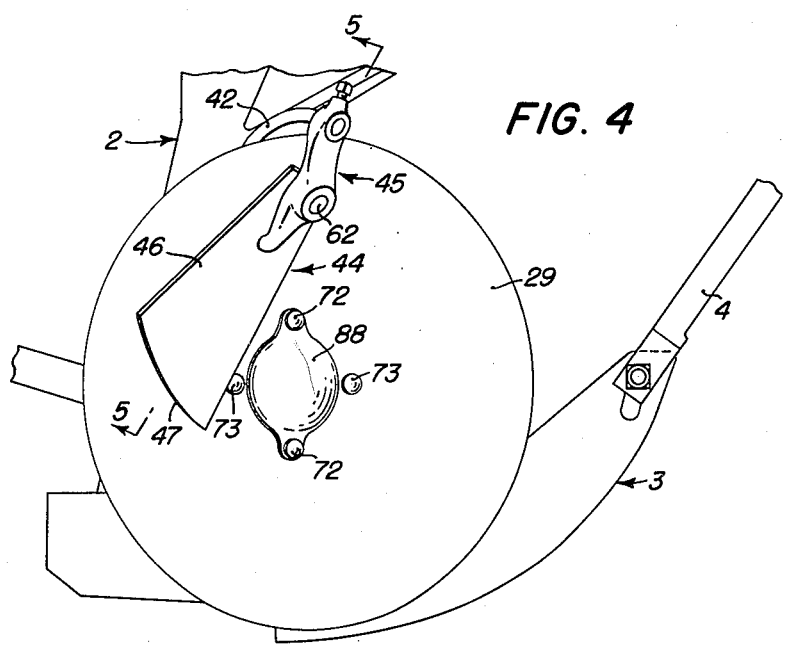
FIG. 4
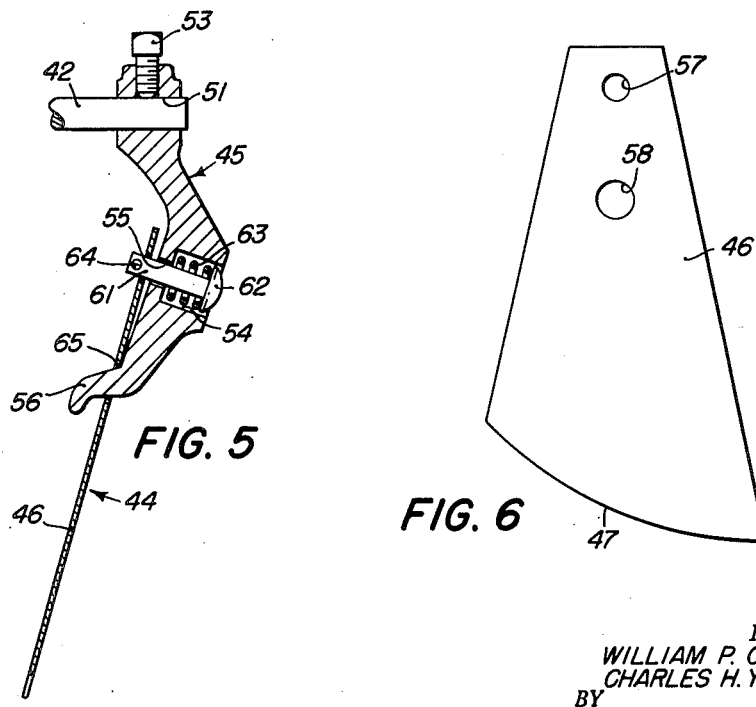
FIG. 5
FIG. 6
INVENTORS.
WILLIAM P. OEHLER
CHARLES H. YOUNGBERG
BY
R C Johnson
ATTORNEYS Patented Dec. 16, 1952

2,621,983

UNITED STATES PATENT OFFICE 2,621,983

FURROWING ATTACHMENT

William P. Oehler and Charles H. Youngberg, Moline, Ill., assignors to Deere & Company, Moline, Ill., a corporation of Illinois Application April 14, 1949, Serial No. 87,524

2 Claims. (Cl. 308—19)

The present invention relates generally to planters and more particularly to planters of the type adapted to deposit seed in relatively deep furrows.

The object and general nature of the present invention is the provision of a new and improved disk furrow-opener support adapted to be attached to the shank of a planter of the lister type, especially adapted for use in relatively loose ground. More particularly, it is a feature of this invention to provide a new and improved disk support wherein the same may readily be clamped to a planter shank in different vertical positions and firmly and positively held in different positions of adjustment.

Specifically, it is a feature of this invention to provide a disk furrow attachment for planters and the like, especially planters having a shank with a forward serrated edge and in which the disk furrow attachment includes a disk support member having one or more ridges cooperating with the aforesaid serrations, with clamping means acting between the disk support and the shank at the opposite side thereof for holding the ridged portion of the disk support against the serrated portion of the planter shank.

These and other objects and advantages of the present invention will be apparent to those skilled in the art after a consideration of the following detailed description, taken in conjunction with the accompanying drawings in which:

Figure 4 is a fragmentary side view of the furrow opener unit, showing the bearing closure cap and the scraper mounting.

Figure 5 is a section taken along the line 5—5 of Figure 4.

Figure 6 is a detail view of the scraper plate.

Figure 1:
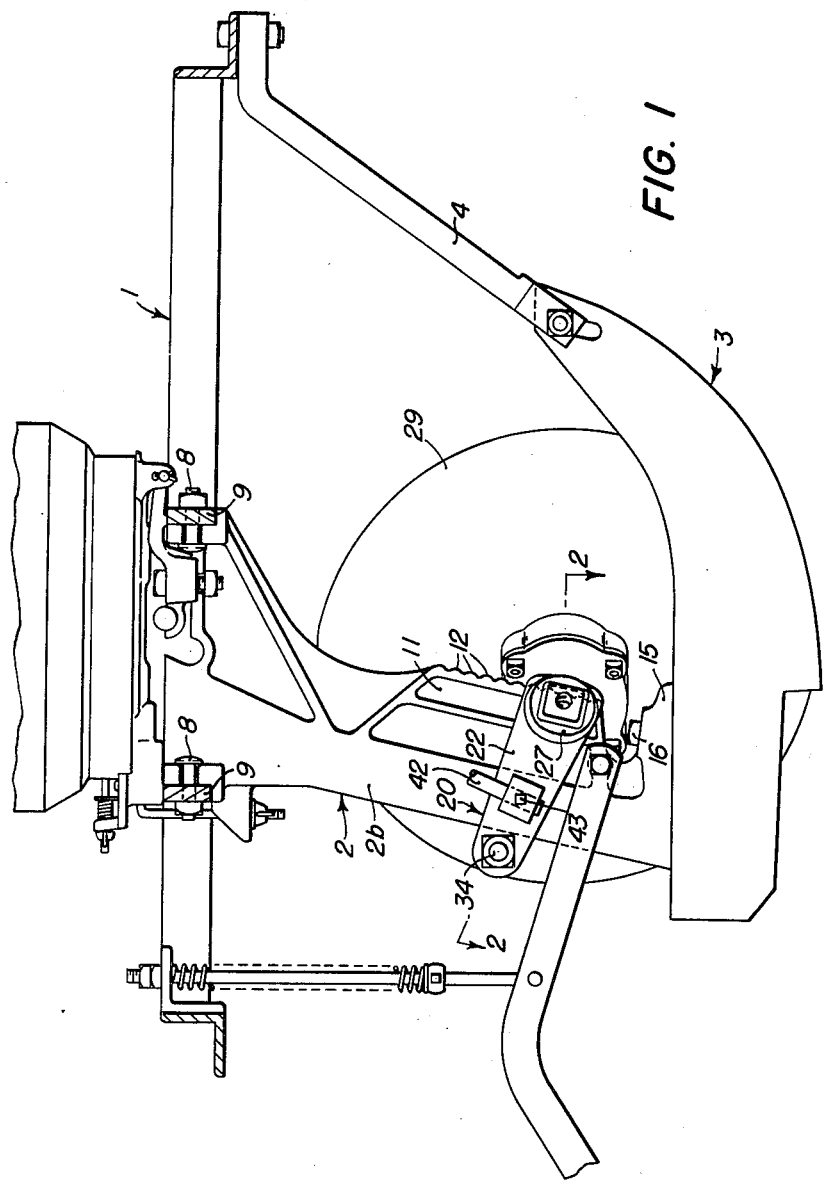
Figure 1 is a side view of one of the planting units of a loose ground or lister type planter in which the principles of the present invention have been incorporated.

Referring now to the drawings, the reference numeral 1 indicates the frame of a planter in which the principles of the present invention have been incorporated. The planter includes a shank 2 and a runner 3 connected to the lower end of the shank so as to receive seed therefrom, and a runner brace 4 which connects the forward end of the runner or shoe 3 to the forward portion of the planter frame 1. The shank 2, which preferably is a two piece construction, is bolted at its upper end, as at 8, to two of the cross bars 9 constituting a part of the planter frame 1. The two halves making up the planter shank 2 are indicated by the reference numerals 2a and 2b, and each shank portion includes a forwardly disposed section 11 which is provided with a plurality of notches or serrations, indicated generally at 12. The lower portion of the shank 2 is of conventional construction, so far as the present invention is concerned and includes a lower extension 15 which provides means receiving a bolt 16 by which the runner 3 is fixed to the lower portion of the shank 2.

The disk furrow-opener support, with which the present invention is more particularly concerned, is indicated in its entirety by the reference numeral 20 and comprises a generally U-shaped member having arm portions 21 and 22 and a central section 23 connecting the two arm portions. The central section 23 is provided with a pair of vertically spaced inwardly facing ridges 25 which are spaced apart so as to seat in certain of the serrations or notches 12 in the shank 2, when the disk support 20 is mounted on the shank 2. The forward portion of the disk support 20 is provided with a pair of tapped bosses 27 which receive the bearing means 28 by which the disks 29 are mounted for rotation on the support 20. The bearing construction 28 will be described below.

Figure 2:
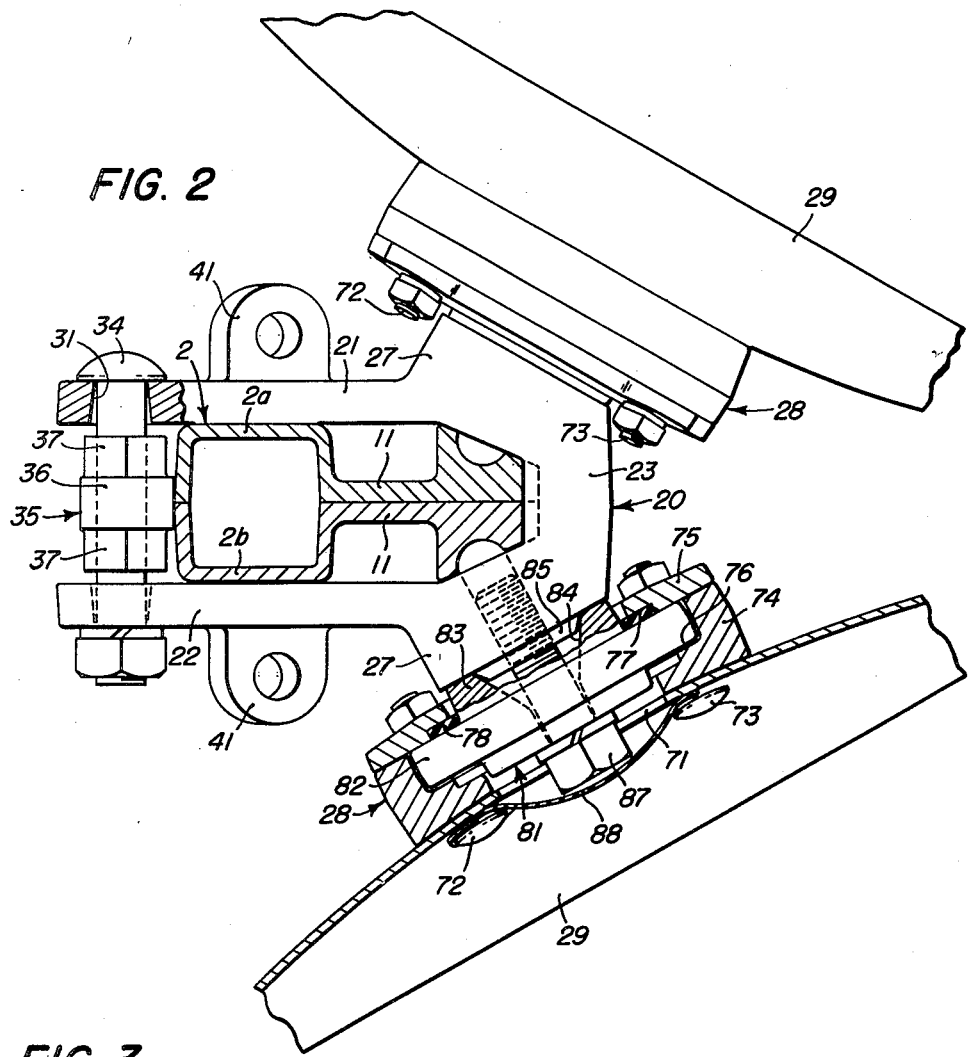
Figure 2 is a detailed sectional view taken along the line 2—2 of Figure 1.
Figure 3:
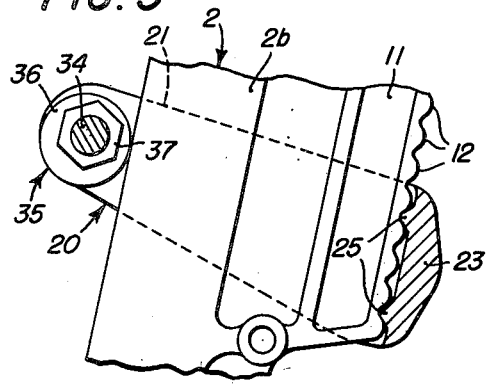
Figure 3 is a fragmentary enlarged view showing the notched and serrated construction of the planter shank and the disk support.

As best shown in Figure 2, the rear end portions of the support arms 21 and 22 are apertured, as at 31, and extend rearwardly beyond the rear edge of the shank 2. Disposed within the apertures 31 of the arm portions 21 and 22 is a bolt 34 on which a clamping cam member 35 is disposed, lying between the rear ends of the arms 21 and 22. The clamping member 35 is formed with a central eccentrically disposed shank-engaging portion 36 and polygonal wrench-receiving portions 37 at opposite sides thereof.

Each of the arm portions 21 and 22 is formed with an apertured lug 41 in which the lower end of a scraper bracket 42 is disposed, being held in place therein by a set screw 43 or the like. The upper end of each scraper bracket 42 is shaped to extend laterally outwardly and receives a scraper 44 which serves to remove adhering soil and the like from the associated furrow opening disk 29. The scraper 44 comprises a scraper bracket casting 45 and a scraper blade 46 comprising a substantially flat plate having a lower curved edge 47. The scraper bracket casting 45 comprises an elongated member symmetrical about a central plane and including at its upper end a transverse opening 51 in which the upper laterally outturned portion of the bracket 42 is received. A set screw 53 carried by the upper portion of the bracket 45 serves to retain the latter in position on the laterally outturned portion of the bracket 42. The lower section of the bracket 45 is provided with a spring-receiving socket 54 in the bottom of which is an opening 55 leading to the other side of the bracket 45. The lower portion of the bracket 45 extends downwardly and laterally inwardly toward the associated disk, terminating in a hook portion 56. The scraper plate 46 is formed with a pair of openings 57 and 58 which lie in a center line of the plate 46. The lower opening is adapted to engage over the hook portion 56 of the bracket 45 and the upper opening 57 is adapted to receive a pin 61 having a hub 62 against which a spring 63, seated in the socket 54, bears, the other end of the pin 61 extending through the opening 55 and apertured to receive a cotter 64 which holds the pin 61 connected to the upper end of the scraper blade 46. The spring 63 acts through the pin 61 against the upper end of the scraper plate 46, causing the latter to rock about a fulcrum point 55 on the bracket casting 45 and so hold the curved edge 47 up against the associated disk.

The scraper construction just described has the advantage that adjustments may easily and quickly be made. By loosening the upper set screw 53, the scraper 44 may be shifted toward or away from the associated disk, and by loosening the set screw 43, the scraper bracket 42 may be turned in one direction or the other so as to bring the scraper in the proper position. Also, when the set screw 53 is loosened, the bracket casting 45 may be turned in one direction or the other to further position the scraper plate 46 relative to the associated disk. Since the scraper bracket 42 is fixed directly to the associated furrow opener support 20, vertical adjustments of the latter relative to the shank 2 do not affect the position of the scrapers relative to the furrow-opening disk carried by the support 20. Since the scraper bracket castings 45 are symmetrical, they need not be made in rights and lefts, and the same is true of the plates 46, since the holes 57 and 58 are disposed in the center line of the plate, and hence the scraper plates need not be made in rights and lefts, it merely being necessary to assemble the plates 46 with either one side or the other side outwardly according to whether the plate is mounted on the right side or the left side of the furrow-opener support 20.

The disk bearing construction 28 will now be described. Each disk 29 is apertured centrally, as at 71, and rigidly outwardly thereof is provided with four holes adapted to receive two pairs of bolts, one pair being indicated by the reference numeral 72 and the other pair being indicated by the reference numeral 73. The movable portion of the bearing 28 consists of two companion members 74 and 75. The member 74 is annular and is of substantial thickness, having an annular interior groove 76. Both members 74 and 75 are provided with four holes to receive the bolts 72 and 73. The member 75 is in the nature of a cap adapted to be secured against the inner edge of the member 74. The member 75 is provided with an interior annular groove 77 to receive sealing means 78. The sealing means 78 acts against a stationary bearing member 81 which includes a flange 82 fitting snugly in the annular groove 76 in the bearing member 74. The stationary bearing member 81 includes an inwardly directed extension 83 which has an outwardly flared opening 84 extending therethrough. The opening 84 is square in section and is adapted to fit against a tapered part 85 formed on the associated tapped boss 27 of the disk furrow-opener support 20. The stationary bearing member 81 is adapted to be fixed to the support 20 by a stud bolt 87, the head of which extends through the opening 71 in the associated disk 29. In order to prevent the entrance of soil, grit and the like into this portion of the bearing, a cap plate 88 is provided. As best shown in Figure 4, the cap is provided with two openings to receive the bolts 72 only. However, the cap 88 covers entirely the opening 71 and preferably is cemented to or otherwise tightly sealed to the disk 29.

Referring to Figure 4, it will be noted that by removing the bolts 72, the closure plate 88 may be removed from the outer side of the disk 29. This provides access to the attaching stud bolt 87, and by removing the latter, the disk 29 and the bearing structure 28 may be removed as a unit from the support 20 without disturbing any of the bearing parts or the bearing seal 78. If access to the bearing structure is desired, the same may be secured merely by removing the other bolts 73, which permits dismantling of the bearing unit. Since the bolts 73 do not pass through the closure plate 88, it will be seen that so long as the bolts 73 are tight, the bearing structure remains intact and the closure plate 88 may be attached and removed, together with the attaching stud bolt 87, as many times as desired.

In operation, when it is desired to raise or lower the furrow-opening disks 29 and their support 20, the nut 45 on the end of the clamping bolt 34 is loosened to permit the clamping cam member 35 to be turned. The latter is turned preferably by engaging the wrench with one or the other of the hexagonal sections 37, turning the same until the eccentric portion 36 is rocked away from the rear side or edge of the shank 2. This loosens the U-shaped support 20 and permits the same to be shifted so as to disengage the ridges or ribs 25 from the serrations 12 on the forward edge of the shank 2. After the support 20 has been raised or lowered to the desired point, the cam member 35 is then turned so as to cause the eccentric portion 36 to bear against the rear edge of the shank 2, drawing the support 20 rearwardly with respect thereto so as to firmly and positively engage the ribs 25 in the serrations 12. After the cam member 35 has been turned into a tightened position, the bolt 34 is tightened so as to insure holding the cam member 35 in position.

While we have shown and described above the preferred structure in which the principles of the present invention have been incorporated, it is to be understood that our invention is not to be limited to the particular details, shown and described above, but that, widely different means may be employed in the practice of the broader aspects of our invention.

What we claim, therefore, and desire to secure by Letters Patent is:

1. A bearing construction for a disk furrow opener, comprising a stationary bearing member adapted to be fixed to a support, a movable bearing member including a pair of bearing sections embracing said stationary bearing member on opposite sides thereof, means extending through said disk and both of said bearing sections for fixing said disk to said movable bearing member with said sections disposed on opposite sides of said stationary bearing member, said disk having a central opening, means disposable in said central opening for fixing said stationary bearing member to said support, a cap for closing said opening, and means extending through said cap, said disk, and both of said bearing sections for fixing said cap in position over said opening, said last mentioned means also serving to fix both of the bearing sections of said movable bearing member to said disk.

2. For use with an agricultural implement including a support and a disk furrow opener, said disk having a central opening, a bearing construction comprising a stationary bearing member, a movable bearing member comprising separable parts adapted to embrace said stationary bearing member on opposite sides thereof, means for fixing said separable members in position about said stationary bearing member and to said disk, thereby holding said stationary and movable bearing members in assembled relation with respect to said disk, means disposable in the central opening of said disk for fixing said stationary bearing member to said support, a closure cap disposable over said central opening of the disk, and means for fastening said closure cap to said disk, said last mentioned fastening means being connected with said separable bearing parts and serving also to fix said parts to said disk, said first mentioned fastening means holding said separable parts in assembled relation to said disk when said last metioned fastening means is removed to provide for removal of said closure plate and access to said stationary bearing fastening means.

WILLIAM P. OEHLER.
CHARLES H. YOUNGBERG.

REFERENCES CITED

The following references are of record in the file of this patent:

UNITED STATES PATENTS

| Number | Name | Date |
|---|---|---|
| 737,153 | Saltsman | Aug. 25, 1903 |
| 881,141 | Nelson | Mar. 10, 1908 |
| 975,459 | Rieske et al. | Nov. 15, 1910 |
| 984,626 | Waterman | Feb. 21, 1911 |
| 991,158 | Logan et al. | May 2, 1911 |
| 1,131,857 | Offerman | Mar. 16, 1915 |
| 1,142,185 | Lee | June 8, 1915 |
| 1,169,183 | Orndoff | Jan. 25, 1916 |
| 1,514,974 | Ladd | Nov. 11, 1924 |
| 1,602,782 | Rippy et al. | Oct. 12, 1926 |
| 2,019,569 | Justesen | Nov. 5, 1935 |
| 2,410,927 | Callahan et al. | Nov. 12, 1946 |